United States Patent
Park (10) Patent No.: US 9,125,002 B2
(45) Date of Patent: Sep. 1, 2015

(54) APPARATUS AND METHOD FOR CONNECTING WITH BLUETOOTH DEVICE IN PORTABLE TERMINAL

(75) Inventor: Sung-Kyu Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 222 days.

(21) Appl. No.: 13/592,667

(22) Filed: Aug. 23, 2012

(65) Prior Publication Data

US 2013/0072119 A1 Mar. 21, 2013

(30) Foreign Application Priority Data

Sep. 16, 2011 (KR) ........................ 10-2011-0093312

(51) Int. Cl.
*H04B 7/00* (2006.01)
*H04W 8/00* (2009.01)
*H04W 84/18* (2009.01)
*H04W 12/04* (2009.01)

(52) U.S. Cl.
CPC .............. *H04W 8/005* (2013.01); *H04W 12/04* (2013.01); *H04W 84/18* (2013.01)

(58) Field of Classification Search
CPC ..... H04W 84/18; H04W 36/30; H04W 8/005; H04L 2209/80; H04L 41/12; H04L 2209/56; H04L 63/061

USPC .......... 370/252, 254, 255, 328, 443; 380/270, 380/277; 709/220–222, 224; 455/41.1–41.3
See application file for complete search history.

(56) References Cited

U.S. PATENT DOCUMENTS

| | | | |
|---|---|---|---|
| 2003/0037125 A1* | 2/2003 | Luman et al. | 709/220 |
| 2007/0109989 A1* | 5/2007 | Nakagawa et al. | 370/328 |
| 2008/0076389 A1 | 3/2008 | Lee et al. | |
| 2008/0177154 A1* | 7/2008 | Hansen et al. | 600/300 |
| 2008/0205315 A1* | 8/2008 | Park et al. | 370/310 |
| 2008/0287062 A1* | 11/2008 | Claus et al. | 455/41.2 |
| 2009/0034498 A1* | 2/2009 | Banerjea et al. | 370/338 |
| 2010/0040233 A1* | 2/2010 | Ganapathy | 380/277 |
| 2010/0304674 A1* | 12/2010 | Kim et al. | 455/41.2 |

FOREIGN PATENT DOCUMENTS

KR 10-2008-0026954 A 3/2008

* cited by examiner

*Primary Examiner* — Golam Sorowar
(74) *Attorney, Agent, or Firm* — Cha & Reiter, LLC (57) ABSTRACT

An apparatus and method operative in a portable terminal, for connecting with a Bluetooth or other short range protocol device are disclosed. The portable terminal searches for the presence of accessories such as a headset or printer within a short range. The terminal pairs with at least one discovered accessory in a pairing process and acquires and stores connection information associated with each paired accessory in the pairing process. The connection information includes at least one of a Bluetooth address, a WiFi address, a security key, and function information for the paired accessory. The connection information is then shared with at least one peer terminal to facilitate subsequent pairing between the at least one peer terminal and the accessory.

18 Claims, 7 Drawing Sheets

APPARATUS AND METHOD FOR CONNECTING WITH BLUETOOTH DEVICE IN PORTABLE TERMINAL

CLAIM OF PRIORITY

This application claims the benefit under 35 U.S.C. §119(a) of a Korean patent application filed in the Korean Intellectual Property Office on Sep. 16, 2011 and assigned Serial No. 10-2011-0093312, the entire disclosure of which is hereby incorporated by reference.

BACKGROUND

1. Technical Field

The present disclosure relates generally to mobile terminals and more particularly to techniques by which portable terminals may connect to Bluetooth devices.

2. Description of the Related Art

In recent years, the use of portable terminals has sharply risen due to a number of factors such as improved technology and functionality and reduced cost. Thus, service providers and terminal manufacturers are competitively developing portable terminals having more convenient functions to secure many users.

For example, today's portable terminals provide a phonebook, games, a schedule managing function, a Short Message Service (SMS), a Multimedia Message service (MMS), a Broadcasting Message Service (BMS), an Internet service, an electronic mail (e-mail) service, a wake-up call, an MPEG-1 Audio Layer 3 (MP3), a digital camera, etc.

More recently, portable terminals have become equipped with an emerging variety of functions such as a headset function, a music function, a printing function, and a file transfer function through the Bluetooth protocol. Bluetooth is a short range communication technology between devices to replace cables that would otherwise be used to communicate.

The Bluetooth protocol utilizes the master-slave concept, where a Bluetooth-capable device (herein, "Bluetooth device") can operate as a master and/or a slave. A device operating as a master is in control of communications and can communicate concurrently with up to seven slaves using time domain multiplexing (TDM). A portable terminal typically operates as a master, so as to communicate with slave devices such as a wireless headset or a printer. Herein, a Bluetooth device that typically operates as a slave, such as a headset or printer, will be referred to as an "accessory". In cases where a portable terminal communicates with another master-capable device such as another portable terminal or a desktop PC, the other device will be referred to as a "peer" device or terminal.

To wirelessly communicate with another Bluetooth device, the portable terminal first searches for the presence of other Bluetooth devices, where each is equipped with a Bluetooth module. In this process, the portable terminal transmits inquiry signals at Bluetooth frequencies and ascertains if suitable responses are received. Upon receiving a response, the portable terminal performs a pairing process of to verify it is possible to communicate with a "discovered" Bluetooth device. When successfully paired, the portable terminal has a communication authorization state and starts communication with the paired device.

A process of connecting with each discovered Bluetooth device is as follows. The portable terminal searches for the presence of Bluetooth devices capable of connecting with the portable terminal, discovers devices and generates a list of the discovered devices on the portable terminal display. The list allows a user to select one or more of the discovered Bluetooth devices to be connected (paired).

As described above, the portable terminal allows the user to select a Bluetooth device to be used on the list for the discovered Bluetooth devices capable of connecting with the portable terminal. The portable terminal communicates with a selected Bluetooth device and performs a service corresponding to the device.

SUMMARY

The present invention recognizes a problem in prior art Bluetooth communication that arises particularly when a user desires to use multiple portable terminals or peer devices to communicate with one or more Bluetooth accessories. That is, each portable terminal must perform the pairing process with a desired accessory (or other peer device), which can result in inconvenient delays due to the time required to achieve successful pairing.

For instance, assume that a user would like to concurrently use two portable terminals, A and B, with a Bluetooth headset. For example, the user may wish to select between music stored in the two portable terminals for current listening. The user began the process using portable terminal A, by pairing portable terminal A with the headset. Thereafter, when the user desires to select from music stored in portable terminal B, there is a problem in that he or she must first perform a pairing process between portable terminal B and the headset. That is, the user must operate terminal B to first search for the presence of Bluetooth devices, and then select the desired headset from a list of discovered devices to perform pairing.

Therefore, an apparatus and method for omitting an unnecessary pairing process between devices of the user is needed.

Accordingly, an aspect of the present invention is to provide an apparatus and method for simplifying a Bluetooth connection process in a portable terminal.

Another aspect of the present invention is to provide an apparatus and method for sharing pairing information acquired when performing a pairing process in a portable terminal.

Another aspect of the present invention is to provide an apparatus and method for providing pairing information to an authorized terminal in a portable terminal.

In accordance with an embodiment, a method and apparatus operative in a portable terminal, for connecting with a Bluetooth or other short range protocol is provided. The portable terminal searches for the presence of accessories such as a headset or printer within a short range. The terminal pairs with at least one discovered accessory in a pairing process and acquires and stores connection information associated with each paired accessory in the pairing process. The connection information includes at least one of a Bluetooth address, a WiFi address, a security key, and function information for the paired accessory. The connection information is then shared with at least one peer terminal to facilitate subsequent pairing between the at least one peer terminal and the accessory.

In one design, the sharing of the connection information is performed whenever the portable terminal connects with the at least one discovered accessory.

In another design, the sharing information is shared with each peer terminal connected in the same network to which the portable terminal is connected.

In accordance with an aspect of the present invention, an apparatus is operative in a portable terminal for connecting with another device using a short range communication protocol. The apparatus includes a controller configured to search for one or more accessories within short range of the portable terminal, and control pairing of the portable terminal with a discovered accessory in a pairing process using connection information associated with the accessory. The connection information includes at least one of a Bluetooth address, a WiFi address, a security key, and function information of the accessory. A memory stores the connection information acquired in the pairing process. An information collecting unit manages storage in the memory of a plurality of connection information obtained by the controller in a plurality of respective pairing processes with different accessories. In accordance with an aspect of the present invention, an electronic device is provided. The electronic device includes one or more processors, a memory, and one or more modules, each of which is stored in the memory and is executed by the one or more processors. Each module is configured to control searching for one or more accessories within a short range of the electronic device, pairing of the electronic device with at least one discovered accessory using a short range communication protocol, acquiring and storing connection information associated with each paired accessory, and sharing the connection information with at least one peer device, to facilitate subsequent pairing between the at least one peer device and accessory.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

Exemplary embodiments of the present invention will be described herein below with reference to the accompanying drawings. In the following description, well-known functions or constructions are not described in detail since they would obscure the invention in unnecessary detail.

An apparatus and method for sharing pairing information acquiring when performing a pairing process and for simplifying a short range communication protocol connection process in a portable terminal according to exemplary embodiments of the present invention will now be described in detail. The short range communication process may be a Bluetooth communication, a zigbee communication or a WiFi communication.

As used herein, "portable terminal" signifies an electronic device capable of wireless communication, that can be hand carried. The portable terminal may be a device such as a mobile phone, a media player, a tablet computer, a handheld (laptop) computer, a Personal Digital Assistant (PDA), a netbook, a digital camera, and so forth. A portable terminal may also be an electronic device in which two or more functions are combined.

When a portable terminal or other master device connects with an accessory during the pairing process, it obtains "connection information" from the accessory, such as a device ID, a security key enabling secure Bluetooth communication, and function information identifying the functions that the accessory is capable of performing. Hereafter, such "connection information" will be referred to interchangeably as "pairing information".

Embodiments of the present invention will be described hereafter in connection with the Bluetooth protocol. However, it is understood that implementations of the invention are also possible with other short range communication protocols that utilize pairing between devices, such as Zigbee or WiFi. Such other implementations as alternatives to Bluetooth are understood to be within the scope of the present invention.

Figure 1:
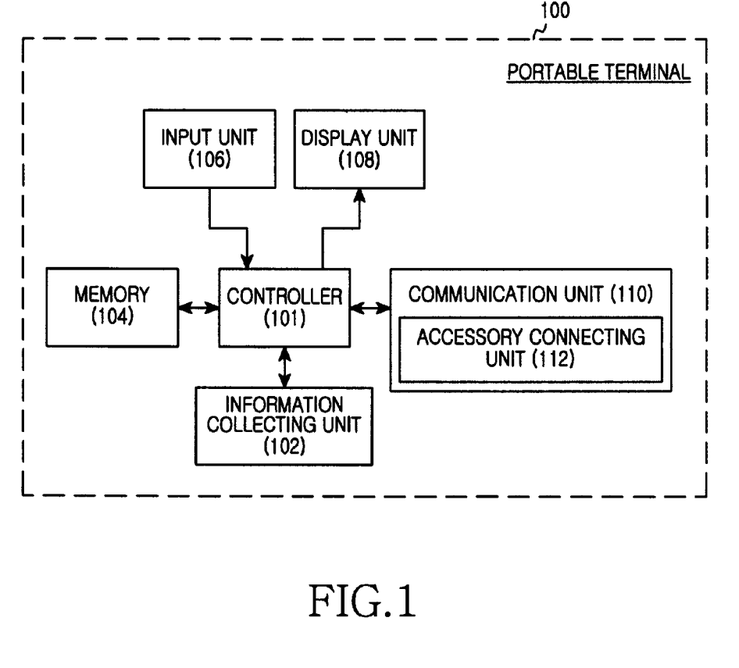
FIG. 1 is a block diagram illustrating an exemplary configuration of a portable terminal for sharing pairing information according to the present invention.

FIG. 1 is a block diagram illustrating an exemplary configuration of a portable terminal, 100, for sharing pairing information according to the present invention. Portable terminal 100 may include a controller 101, an information collecting unit 102, a memory 104, an input unit 106, a display unit 108, and a communication unit 110. The communication unit 110 may include an accessory connecting unit 112.

The controller 101 of the portable terminal 100 may be composed of one or more processors, and controls an overall operation of the portable terminal. For example, the controller 101 performs process and control for voice communication and data communication. In addition to a general function, the controller 101 performs a pairing process for connecting with one or more accessories using Bluetooth or other short range communication protocol. The controller 101 shares connection information (pairing information) acquired in the pairing process with peer terminals, as will be explained below.

The controller 101 may share connection information only with an authorized terminal among terminals connected to the same network. The operation of the controller 101 may be executed by a specific software module (command set) stored in the memory 104. The software module may be executed by the controller 101.

The information collecting unit 102 acquires and stores connection information which includes pairing information about each paired accessory when performing the pairing process and function information of each of the accessories under control of the controller 101.

The operation of the information collecting unit 102 may be executed by the specific software module (command set) stored in the memory 104.

The memory 104 can include Read Only Memory (ROM), Random Access Memory (RAM), and flash ROM. The ROM stores a microcode of a program, which performs process and control of the controller 101 and the information collecting unit 102, and a variety of reference data items.

The RAM is a working memory of the controller 101 and stores temporary data that is generated while various programs are performed. The flash ROM stores a variety of rewritable data, such as phonebook entries, outgoing messages, and incoming messages. The flash ROM can be used to store the connection information acquired by the information collecting unit 102 according to one exemplary embodiment of the present invention. In addition, the memory 104 stores a software module to perform operations of the controller 101 and the information collecting unit 102 according to one exemplary embodiment of the present invention.

The exemplary methods described hereafter may be implemented by means of instructions in one or more software modules stored in the memory 104. The software modules may be executed by the controller 101. Dedicated hardware modules are also possible.

The input unit 106 may be a key type, single touch screen or a combination of keys and touch screen. The key type includes numeral key buttons of '0' to '9' and a plurality of function keys, such as a menu button, a cancel button, an OK button, a talk button, an end button, an Internet access button, a navigation key (or directional key) button, and character input keys. The input unit 106 provides a key input data corresponding to a key pushed by a user to the controller 101. According to one exemplary embodiment of the present invention, the input unit 106 provides input for performing a pairing process and input for sharing the stored connection information to the controller 101.

The display unit 108 displays state information, characters, large volumes of moving and still pictures, etc., which are generated during operation of the portable terminal. The display unit 108 may be a color Liquid Crystal Display (LCD), an Active Matrix Organic Light Emitting Diode (AMOLED), etc. The display unit 108 may include a touch input device. Accordingly, the display unit 108 may be used as an input device when it is applied to a touch input type portable terminal. That is, the input unit 106 and display unit 108 could all be served by a single touch screen.

The communication unit 110 transmits and receives Radio Frequency (RF) signals of data that is input and output through an antenna (not shown). For example, in one type of transmitting process, data to be transmitted is subject to a channel-coding process and a spreading process, and then the data is converted into an RF signal. In a receiving process, the RF signal is received and converted into a baseband signal, and the baseband signal is subject to a de-spreading process and a channel-decoding process, thereby restoring the data. Also, the communication unit 110 transmits the connection information collected by the information collecting unit 102 under control of the controller 101. In addition, the accessory connecting unit 112 included in the communication unit 110 signifies a short range (local area) communication module (e.g., a Bluetooth or WiFi module) capable of connecting with accessories within short range of the portable terminal 100, and performs a pairing process with each of the accessories (which may be selected from a list of discovered accessories).

The function of the information collecting unit 102 may be performed by the controller 101 of the portable terminal. However, the present invention includes the controller 101 and the information collecting unit 102 which are exemplary configurations for convenience of explanation, and are not intended to limit the scope of the present invention. It will be understood by those skilled in the art that various changes in form and details may be made therein without departing from the spirit and scope of the present invention. For example, the information collecting unit 102 may be configured to be processed in the controller 101.

According to the present invention, for example, an electronic device comprising at least one processor, a touch screen, a memory and one or software modules stored in the memory configured for execution by the at least one processor, the software modules including instructions to perform methods described hereunder.

Figure 2:
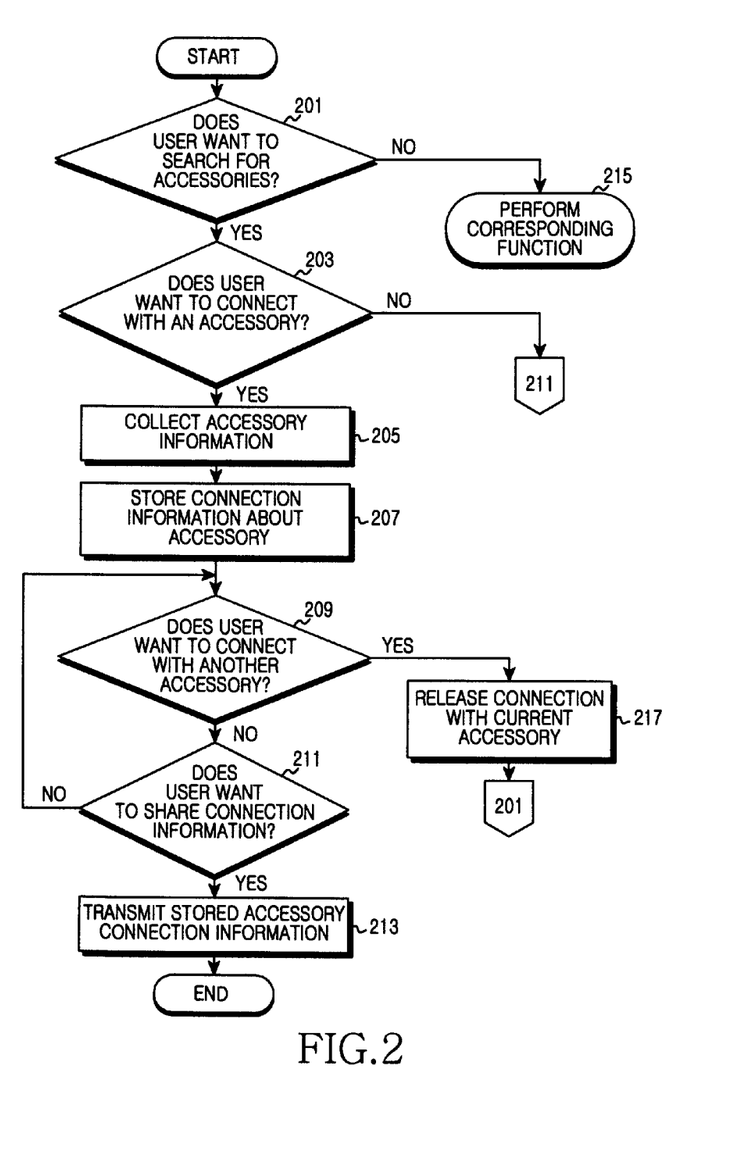
FIG. 2 is a flowchart illustrating a process of sharing accessory connection information in a portable terminal according to one exemplary embodiment of the present invention.

FIG. 2 is a flowchart illustrating a process of sharing accessory connection information in a portable terminal according to one exemplary embodiment of the present invention. In the method, the portable terminal first ascertains at 201 whether a user wants to search for accessories. As mentioned above, herein, an accessory is a device capable of connecting with the portable terminal using Bluetooth or other short range communication protocol. An accessory operates typically as a slave device and may be, for example, a Bluetooth headset, a Bluetooth keyboard, a Bluetooth printer, a device capable of connecting with the portable terminal using WiFi communication, etc. Step 201 may be performed when a user accesses a Bluetooth option in a settings menu of the portable terminal.

When the user wants to search for accessories in step 201, the portable terminal detects a suitable user command therefor and automatically searches for the presence of accessories. (Otherwise, the portable terminal goes into a waiting mode or performs a corresponding function, as indicated by 215.) When one or more accessories are discovered, the portable terminal lists the discovered accessories on the display to allow user selection of an accessory for Bluetooth connection. At 203, the portable terminal determines if one of the listed accessories is selected, signifying the user's desire to connect the portable terminal with that selection. If so, he controller 101 begins a pairing process, i.e., a connection process according to the Bluetooth or other protocol, with the selected accessory.

The portable terminal next proceeds to step 205 and collects accessory connection information. The portable terminal proceeds to step 207 and stores connection information associated with the selected accessory. This connection information may be a Bluetooth (or WiFi) address for the accessory, a device ID, a security key to allow Bluetooth communication, and function information of the accessory. In other words, the connection information is pairing information associated with the accessory, which is acquired from the accessory in the pairing process. Note that the function information for an accessory indicates one or more functions that the accessory is capable of performing (e.g., functions of a headset may includes as a voice reception on/off function and a Light Emitting Diode (LED) on/off function, the latter being used to receive LED on/off commands from the portable terminal in harmony with audio signals)

When the pairing process is complete, the portable terminal can then begin to communicate with the accessory. Moreover, with the connection information thus stored in the portable terminal as managed by the information collecting unit 102, the next time the portable terminal discovers the presence of the same accessory, the portable terminal can use the already stored connection information to shorten the pairing process time for a subsequent communication.

The portable terminal next proceeds to step 209 and determines whether the user wants to connect with another accessory from the list of discovered accessories.

When it is verified that the user wants to connect with another accessory in step 209, the portable terminal proceeds to step 217 and releases the connection with the previously connected accessory. However, as mentioned earlier, in the Bluetooth protocol, a master device may connect concurrently with up to seven slave devices. Therefore, if the result is YES at step 209, the portable terminal can remain connected to the previous accessory, whereby step 217 can be skipped such that the flow proceeds directly to 201. That is, the pairing process can be repeated with another selected accessory while the portable device remains Bluetooth-connected to the previously connected accessory. The portable terminal proceeds to step 201 and performs connection with another accessory selected by the user among discovered accessories. The portable terminal acquires and stores connection information about the newly connected accessory.

On the other hand, when it is determined that the user does not want to connect with another accessory in step 209, the portable terminal proceeds to step 211 and verifies whether the user wants to share connection information. Herein, the process of sharing connection information is performed by providing the previously stored connection information associated with each of the previously paired accessories to another peer terminal. The peer terminal which receives the connection information about each of the accessories omits a subsequent pairing process when connecting with any of the associated accessories, by having the connection information for these accessories, and may connect with each corresponding accessory automatically. That is, the peer terminal which receives the connection information about each of the accessories may recognize that the pairing process with each of the accessories was performed using the received connection information.

When it is verified that the user does not want to share the connection information in step 211, the portable terminal performs the processing from step 209 again. The portable terminal collects connection information about another accessory and verifies whether the user wants to share previously stored connection information.

On the other hand, when the user wants to share the connection information in step 211, the portable terminal proceeds to step 213 and transmits the previously stored connection information associated with each accessory to which the portable terminal was paired, to a peer terminal. The portable terminal may transmit the previously stored connection information about each of the accessories to peripheral terminals which are positioned in the same network according to one exemplary embodiment of the present invention.

For example, the portable terminal 100 communicates with a server (e.g., a cloud server) using a mobile communication network (e.g., a 3G or 4G communication network), a WiFi network, or via a wired Internet connection, and transmits the connection information about each of the accessories. The server may transmit the received accessory connection information to connected peer terminals. As mentioned above, peer terminals are terminals that are capable of operating as master devices in a Bluetooth or other short range communication network, and are thereby able to communicate with accessories.

Alternatively, the portable terminal may transmit previously stored connection information about each of the accessories to connected terminals using local area communication such as Bluetooth communication and infrared ray communication.

In addition, the portable terminal may transmit previous stored connection information about each of accessories to terminals connected to the same network such as a Digital Living Network Alliance (DLNA).

With the accessory connection information thus transmitted to one or more peer terminals, the algorithm of FIG. 2 is completed. As the one or more peer terminals now has the accessory connection information, subsequent Bluetooth connection to a desired accessory is facilitated. For instance, in the example presented above wherein a user of headset accessory would like to switch control of the headset from a portable terminal A to a portable terminal B, the time necessary to implement the switch is significantly reduced.

The method performed according to FIG. 2 may be provided as one or more instructions in one or more software modules stored in the storage unit. In this case, the software modules may be executed by the controller 101.

Figure 3:
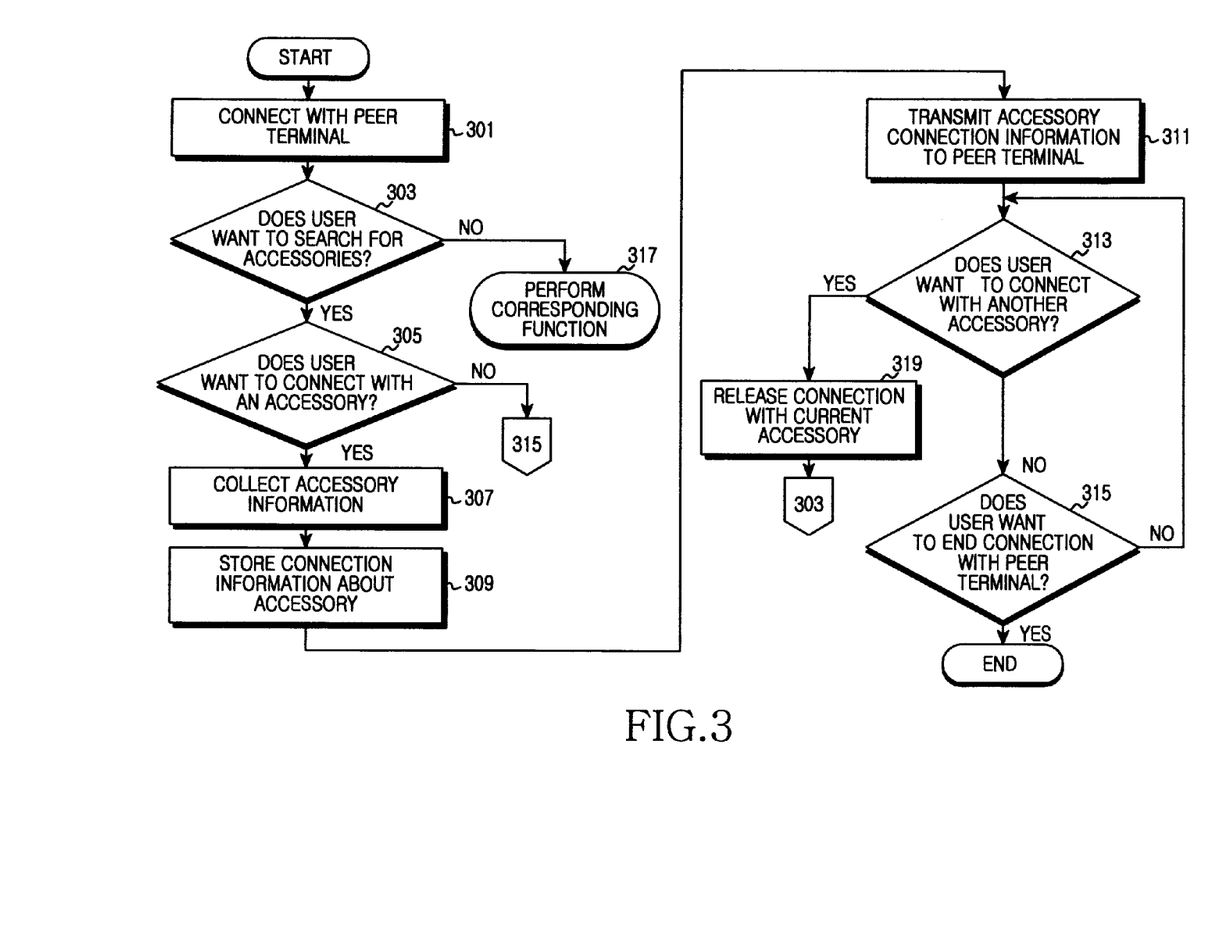
FIG. 3 is a flowchart illustrating a process of sharing accessory connection information in a portable terminal according to another exemplary embodiment of the present invention.

FIG. 3 is a flowchart illustrating a process of sharing accessory connection information in a portable terminal according to another exemplary embodiment of the present invention. The main difference between this process and that of FIG. 2 is that a connection between the portable terminal and one or more peer terminals is already established at the outset, i.e, before the portable terminal acquires accessory connection information in a pairing process. Once the connection information is obtained, it is automatically transmitted to the peer terminal, without user command.

Referring to FIG. 3, the portable terminal performs a process of connecting with a peripheral terminal in step 301. Herein, as described above, the process of step 301 is a process of connecting with a server using a mobile communication network (e.g. 3G or 4G communication network), a WiFi network, or the wire Internet or a process of connecting with a peripheral terminal using local area communication. In addition, the process of step 301 may be a process of performing a DLNA function.

The portable terminal proceeds to step 303 and verifies whether a user wants to search for the presence of accessories capable of connecting with the portable terminal. For example, the portable terminal may search for a Bluetooth device in step 303.

The portable terminal proceeds to step 305 and verifies whether the user wants to connect with any discovered accessories. If NO, the portable terminal proceeds to step 315 and verifies whether the user wants to end connection with a peer terminal. If YES, the portable terminal performs a pairing/connection process with a selected accessory from a displayed list of discovered accessories. The portable terminal next proceeds to step 307 and collects accessory connection information. At step 309, the portable terminal then stores the connection information associated with the selected accessory. Herein, as described above, the portable terminal collects and stores the connection information about the accessory, such as a Bluetooth (or WiFi) address for the accessory, a security key, and accessory function information.

The portable terminal next proceeds to step 311 and transmits the accessory connection information the peer terminal. The portable terminal then proceeds to step 313 and determines whether the user wants to connect with another accessory. If YES, the flow proceeds to step 319 where the connection with the previously connected accessory is optionally released (or it may be maintained if less than seven slave devices are connected, as explained above). The portable terminal next proceeds to step 303 and performs connection with another accessory selected by the user among discovered accessories.

If NO, the portable terminal proceeds to step 315 and ascertains whether the user wants to end the connection with the peer terminal. If NO, the portable terminal performs the processing from step 313 again. If YES, the portable terminal ends the connection with the peer terminal and the algorithm of FIG. 3 ends.

Accordingly, in the method of FIG. 2, the portable terminal stores connection information about one or more accessories and shares this connection information with a peer terminal when connecting with the peer terminal. In the method of FIG. 3, the portable terminal shares connection information about each accessory whenever it connects with the accessory in a state where it is already connected with a peer terminal.

The method performed according to FIG. 3 may be provided via instructions in one or more software modules stored in the memory 104. In this case, the software modules may be executed by the controller 101.

FIGS. 4A through 4D illustrate a process of sharing accessory connection information in a portable terminal according to one exemplary embodiment of the present invention. The process illustrated may correspond to the process of FIG. 2.

Figure 4A:
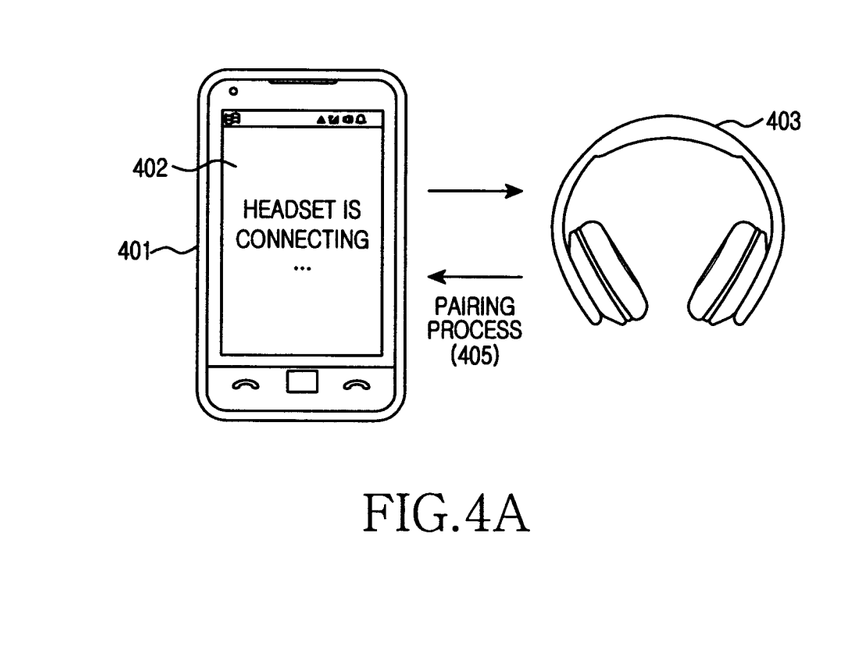
FIGS. 4A and 4D illustrate a process of sharing accessory connection information in a portable terminal according to one exemplary embodiment of the present invention.

As shown in FIG. 4A, the portable terminal 401 performs a pairing process (405) and connects with an accessory 403 which is a Bluetooth headset. A screen 402 displays to the user that a pairing process is in progress. Once pairing is complete, the portable terminal 401 outputs received voice signals or audio file signals to the connected accessory 403.

Figure 4B:
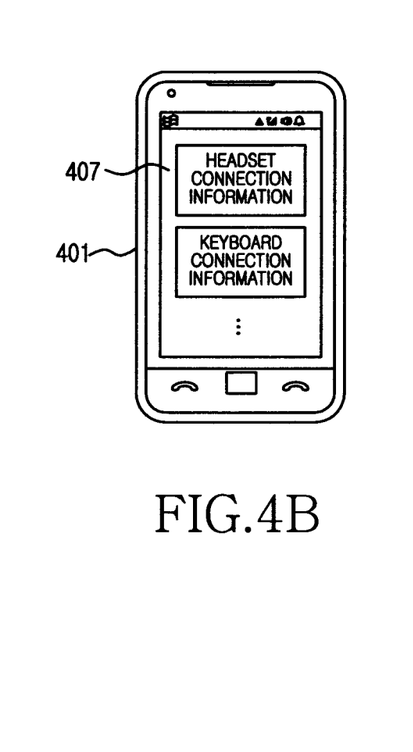

As shown in FIG. 4B, the portable terminal stores connection information associated with the connected accessory as depicted by screen 407). That is, as shown in FIG. 4B, the portable terminal connects with accessories such as a keyboard, a headset, etc. and stores connection information about each of the accessories. Herein, the connection information with the accessories includes pairing information (e.g., a Bluetooth or WiFi address, a security key, etc.) acquired in the pairing process with each of the accessories, function information provided from each of the accessories, etc. The connection information about each of the accessories may be pairing information about each of the accessories.

The portable terminal 401 next performs a process of connecting with a peer terminal to share the previously stored connection information.

Figure 4C:
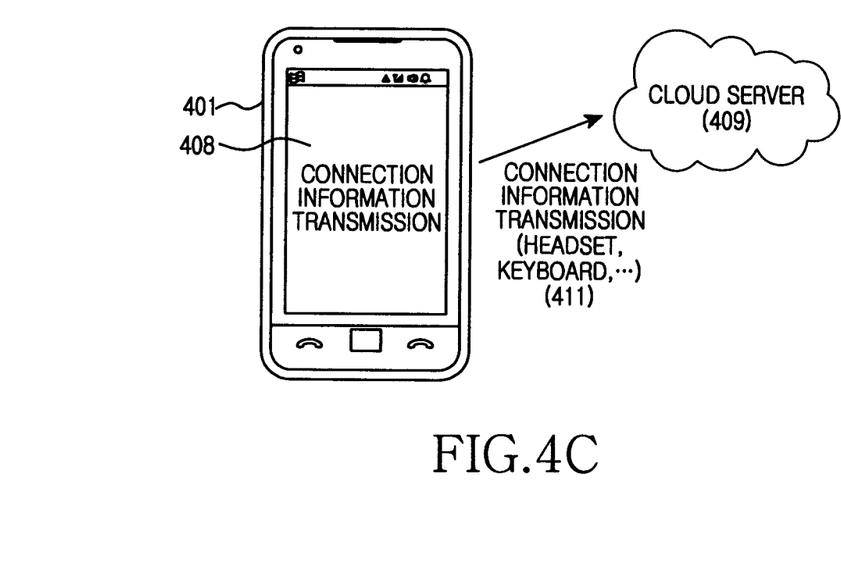

For example, as shown in FIG. 4C, the portable terminal 401 may connect with a cloud server 409 using a mobile communication network (e.g. 3G or 4 G communication network), a WiFi network, or a wired Internet connection. A screen 408 displays to the user the state of connection information transmission.

The portable terminal performs a connection information sharing process by transmitting the connection information about the headset, the keyboard, etc. to the connected cloud server 409 (as depicted by 411).

Figure 4D:
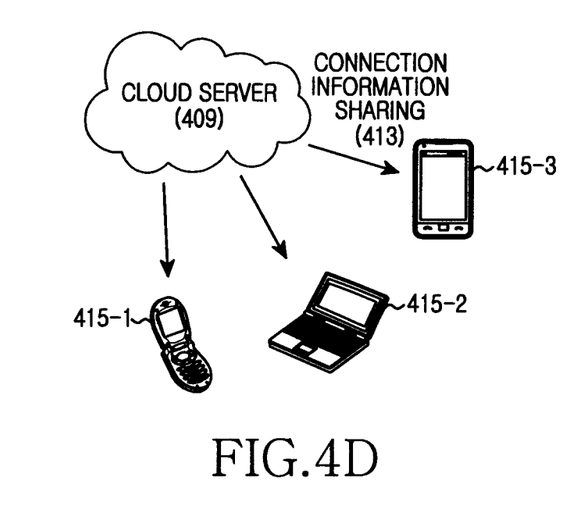

To this end, as shown in FIG. 4D, the cloud server which receives the connection information provides information indicating that connection information is changed to peer terminals 415-1, 415-2, 415-3 connected to the cloud server and transmits the received connection information to share the connection information (as depicted by 413). For this reason, each of the peer terminals 415-1, 415-2, 415-3 which receives the connection information from the cloud server omits or substantially simplifies a connection process (pairing process) when subsequently connecting to the corresponding accessories. Such facilitation is the result of having the connection information for each of the accessories, whereby they may connect with the corresponding accessory automatically or substantially automatically.

The cloud server 409 may transmit the connection information to only authorized terminals with which the connection information is shared by the portable terminal. That is, the portable terminal shares connection information with terminals authorized by a user.

In this regard, each of the peripheral terminals that receives the connection may omit a pairing process when it is verified that an accessory corresponding the received connection information is present in the vicinity of the portable terminal (within the short communication range of the Bluetooth protocol). Connection with the accessory may then be done immediately.

The method performed according to FIGS. 4A through 4D may be provided as instructions in one or more software modules stored in the storage unit. In this case, the software modules may be executed by the controller 101.

Figure 5A:
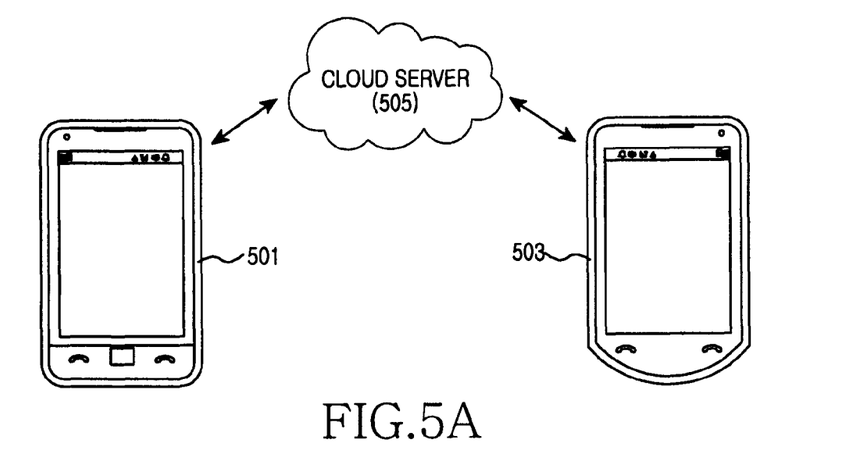
FIGS. 5A and 5C are illustrates a process of sharing accessory connection information in a portable terminal according to another exemplary embodiment of the present invention.
Figure 5B:
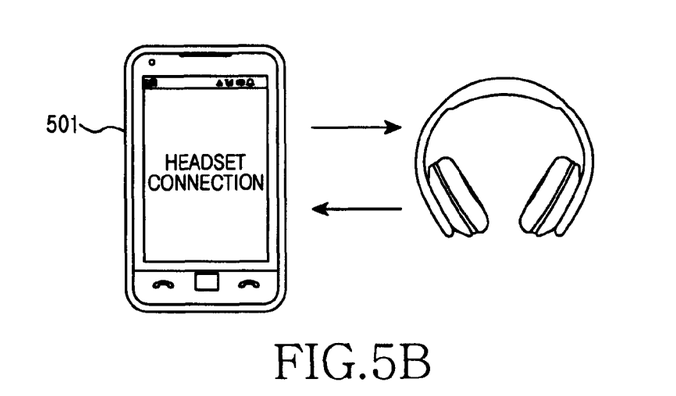
Figure 5C:
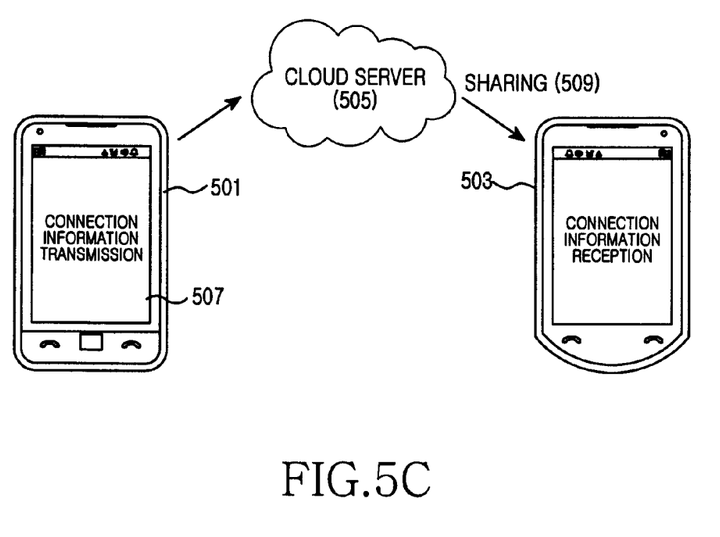

FIGS. 5A through 5C illustrates a process of sharing accessory connection information in a portable terminal according to an exemplary embodiment of the present invention which may correspond to the process illustrated in FIG. 3.

As shown in FIG. 5A, the portable terminal denoted by 501 connects with a cloud server 505 using a mobile communication network (e.g., 3G or 4 G communication network), a WiFi network, or the wire Internet. In addition, as shown in FIG. 5A, a peripheral terminal 503 connects with the cloud server 505.

As shown in FIG. 5B, the portable terminal performs a pairing process and connects with an accessory which is a Bluetooth headset. Once pairing is complete, the portable terminal 501 outputs received voice signals or audio file signals to the headset.

The portable terminal stores connection information about the connected accessory. That is, the portable terminal connects with the headset and acquires and stores pairing information (e.g., a Bluetooth or WiFi address, a security key, etc.) acquired in the pairing process with the headset, function information provided from the headset, etc.

As shown in FIG. 5C, the portable terminal transmits the acquired connection information about the headset to the cloud server (507). As shown in FIG. 5C, the cloud server which receives the connection information informs information indicating that connection information is changed to other peer terminals connected to the cloud server and transmits the received connection information to the other peer terminals (509).

For this reason, each of the peripheral terminals which receive the connection information omits a pairing process when it is verified that the accessory (e.g., headset) corresponding to the received connection information is discovered by the peer terminal (i.e., located in the vicinity thereof and detected), and connects with the accessory immediately.

The method performed according to FIGS. 5A through 5C may be provided as instructions in one or more software modules stored in the storage unit. In this case, the software modules may be executed by the controller 101.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

As described above, the present invention relates to an apparatus and method for sharing pairing information acquired at the portable terminal and reducing the number of pairing processes in which the user of the portable terminal, who uses a plurality of portable terminals, must be performed.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A portable terminal comprising:
a controller to:
while maintaining network communication with at least one remote peer terminal, search one or more remote accessories within short range of the portable terminal, and pair with a discovered accessory using connection information associated with the accessory;
store the connection information associated with the paired accessory in a memory, the connection information comprising at least one of a Bluetooth address, a WiFi address, a security key, and function information of the accessory; and
automatically transmit the connection information to the at least one remote peer terminal,
wherein the at least one remote peer terminal pairs with the discovered accessory upon receipt of the connection information.

2. The portable terminal of claim 1, wherein the controller to establish communication with the at least one remote peer terminal using local area communication.

3. The portable terminal of claim 1, wherein the controller to establish communication with the at least one remote peer terminal using a Wi-Fi network.

4. The portable terminal of claim 1, wherein the controller to establish communication with the at least one remote peer terminal prior to searching the one or more accessories.

5. The portable terminal of claim 1, wherein the controller to further disconnect from the discovered accessory and pair with a different discovered accessory using different connection information.

6. The portable terminal of claim 5, wherein the controller transmits the different connection information to the at least one remote peer terminal.

7. The portable terminal of claim 1, wherein the controller transmits connection information to the at least one remote peer terminal via a server.

8. A method comprising:
while maintaining network communication with at least one remote peer terminal, searching one or more remote accessories within short range and pair with a discovered accessory using connection information associated with the accessory;
storing the connection information associated with the paired accessory in a memory, the connection information comprising at least one of a Bluetooth address, a WiFi address, a security key, and function information of the accessory; and
automatically transmitting the connection information to the at least one remote peer terminal,
wherein the at least one remote peer terminal to pair with the discovered accessory upon receipt of the connection information.

9. The method of claim 8, wherein communication is established with the at least one remote peer terminal using local area communication.

10. The method of claim 8, wherein communication is established prior to pairing with the at least one discovered accessory.

11. The method of claim 8, further comprising:
disconnecting from the discovered accessory;
pairing with a different discovered accessory using different connection information; and
transmitting the different connection information to the at least one remote peer terminal.

12. The method of claim 8, wherein the at least one remote peer terminal is an authorized peer terminal.

13. The method of claim 8, wherein the connection information is transmitted to the at least one remote peer terminal via a server.

14. An electronic device comprising:
at least one processor to:
while maintaining network communication with a server, search one or more remote accessories within short range of the electronic device and pair with a discovered accessory using connection information associated with the accessory;
store the connection information associated with the paired accessory in a memory; and
transmit the connection information to the server, the server configured to forward the connection information to at least one remote peer terminal,
wherein the at least one remote peer terminal pairs with the discovered accessory upon receipt of the connection information.

15. The electronic device of claim 14, wherein the at least one processor to establish communication with the at least one remote peer terminal using local area communication.

16. The electronic device of claim 14, wherein the at least one processor to connect with the at least one remote peer terminal prior to pairing with the at least one accessory.

17. The electronic device of claim 14, wherein the at least one remote peer terminal is an authorized peer terminal.

18. The electronic device of claim 14, wherein the connection information is at least one of a Bluetooth address, a WiFi address, a security key, and function information provided by each paired accessory.

* * * * *